United States Patent
Ninomiya

(10) Patent No.: US 10,243,486 B2
(45) Date of Patent: Mar. 26, 2019

(54) VIBRATION WAVE MOTOR

(71) Applicant: CANON KABUSHIKI KAISHA, Tokyo (JP)

(72) Inventor: Shunsuke Ninomiya, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 15/205,121

(22) Filed: Jul. 8, 2016

(65) Prior Publication Data
US 2017/0019036 A1    Jan. 19, 2017

(30) Foreign Application Priority Data

Jul. 15, 2015 (JP) ................. 2015-141270

(51) Int. Cl.
    *H02N 2/00*   (2006.01)
    *H02N 2/02*   (2006.01)
    *H02N 2/04*   (2006.01)

(52) U.S. Cl.
    CPC .......... *H02N 2/0055* (2013.01); *H02N 2/026* (2013.01); *H02N 2/04* (2013.01)

(58) Field of Classification Search
    CPC ......... H02N 2/0055; H02N 2/026; H02N 2/04
    See application file for complete search history.

(56) References Cited

U.S. PATENT DOCUMENTS

| 2011/0043076 A1 | 2/2011 | Tsubata et al. | |
| 2014/0285066 A1* | 9/2014 | Yamamoto | H02N 2/026 310/323.02 |
| 2014/0293463 A1* | 10/2014 | Yamanaka | H02N 2/026 359/824 |
| 2015/0183001 A1* | 7/2015 | Yamamoto | B06B 1/0644 310/334 |

(Continued)

FOREIGN PATENT DOCUMENTS

| CN | 102736357 A | 10/2012 |
| CN | 104753390 A | 7/2015 |

(Continued)

OTHER PUBLICATIONS

Aug. 3, 2018 Chinese Office Action, which is enclosed with an English Translation, that issued in Chinese Patent Application No. 201610554550.7.

*Primary Examiner* — Bryan P Gordon
(74) *Attorney, Agent, or Firm* — Cowan, Liebowitz & Latman, P.C.

(57) ABSTRACT

Included are a vibrator including a protruding portion that performs high frequency vibration; a friction member, the vibrator being pressed to cause the protruding portion to abut to the friction member; a fixing member to which either the vibrator or the friction member; a movable member that moves integratedly with either the vibrator or the friction member; a plurality of rotating members enabling relative movement between the friction member and the movable member; and a falling off restriction portion that prevents the (Continued)

rotating members provided in either the fixing member or the movable member from falling off, wherein the falling off restriction portion abuts to an opposed portion opposed to the falling off restriction portion to restrict a movable range of the movable member in a pressing direction and to prevent the rotating members from falling off.

9 Claims, 8 Drawing Sheets

(56) References Cited

U.S. PATENT DOCUMENTS

| | | | |
|---|---|---|---|
| 2015/0200611 A1* | 7/2015 | Yamamoto | H02N 2/026 310/323.03 |
| 2016/0111979 A1* | 4/2016 | Yamanaka | H02N 2/0055 359/814 |
| 2016/0336875 A1* | 11/2016 | Yamamoto | H02N 2/0055 |

FOREIGN PATENT DOCUMENTS

| | | |
|---|---|---|
| JP | 2014-183724 A | 9/2014 |
| TW | 201325064 A | 6/2013 |

* cited by examiner

VIBRATION WAVE MOTOR

BACKGROUND OF THE INVENTION

Field of the Invention

The present invention relates to a vibration wave motor, and particularly, relates to a vibration wave motor for linear, in which an elastic body is formed into a plate shape.

Description of the Related Art

Conventionally, vibration wave motors, which have features such as compact lightweight, high-speed drive and silent drive, have been employed for a lens barrel of an imaging device. Among them, with regard to a vibration wave motor for linear drive, a vibration wave motor as below is disclosed in Japanese Patent Application Laid-Open No. 2014-183724. The vibration wave motor disclosed in Japanese Patent Application Laid-Open No. 2014-183724 as below is constituted by a vibration plate including protruding portions and performing high frequency vibration and a friction member in contact with the protruding portions. The vibrator that is caused to generate the high frequency vibration is brought into pressed contact with the friction member to move relatively the vibrator and the friction member. To reduce sliding loads generated by pressing force applied to the vibrator upon relative movement, a movable member that holds the vibrator and a fixing member that holding the friction member are configured to be capable of moving relatively in a freely sliding manner by rotating members.

In the vibration wave motor disclosed in Japanese Patent Application Laid-Open No. 2014-183724, the rotating members are disposed between the fixing member and the movable member thereby reducing sliding resistance upon relative movement. In this case, the rotating members are displaced between a recessed portion provided on the fixing member and a recessed portion provided on the movable member, and are urged against the fixing member through the movable member by the pressing force generated by the pressing member. In such the configuration, when impact or the like is applied to an ultrasonic motor and the applied impact force exceeds the aforementioned urging force, there has been a problem that the rotating members fall off of the recessed portions to cause drive to be unstabilized, further sliding loads to be increased or the like.

SUMMARY OF THE INVENTION

Therefore, it is an object of the present invention to drive a vibration wave motor stably while preventing a rotating member from falling off of a recessed portion even in a case where external forces, such as impact are applied to the vibration wave motor.

In order to achieve the foregoing object, a vibration wave motor of the invention includes:

a vibrator including a protruding portion that performs high frequency vibration;

a friction member, the vibrator being pressed to cause the protruding portion to abut to the friction member;

a fixing member to which either the vibrator or the friction member;

a movable member that moves integratedly with either the vibrator or the friction member;

a plurality of rotating members enabling relative movement between the friction member and the movable member; and a falling off restriction portion that prevents the rotating members provided in either the fixing member or the movable member from falling off, wherein the falling off restriction portion abuts to an opposed portion opposed to the falling off restriction portion to restrict a movable range of the movable member in a pressing direction and to prevent the rotating members from falling off.

According to the invention, stable drive can be achieved while preventing a rotating member from falling off of a recessed portion even in a case where external forces, such as impact are applied to the vibration wave motor.

Further features of the present invention will become apparent from the following description of exemplary embodiments with reference to the attached drawings.

DESCRIPTION OF THE EMBODIMENTS

Figure 1A:
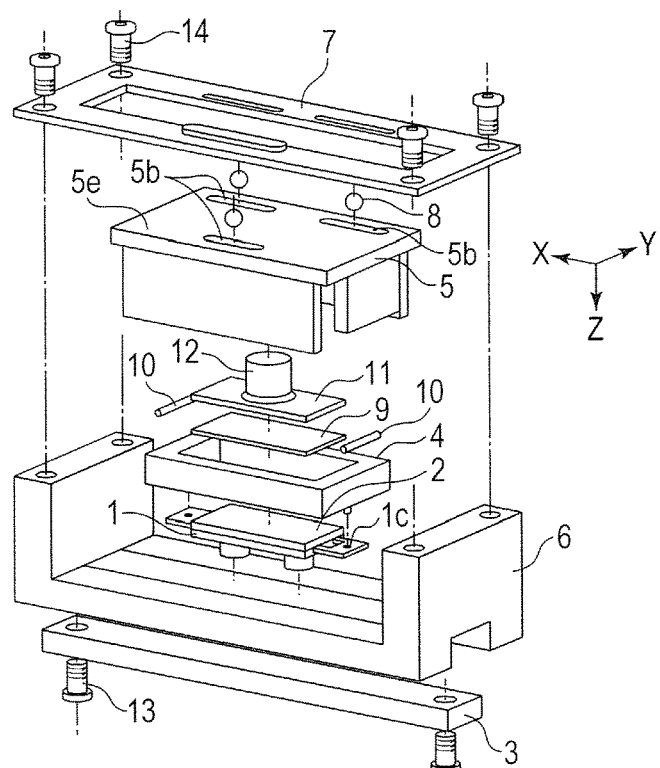
FIGS. 1A and 1B are exploded perspective views each illustrating a vibration wave motor according to a first embodiment.

Embodiments for carrying out the present invention will be explained with reference to the accompanying drawings. In the drawings, the same components are denoted by the same reference numerals.

First Embodiment

Hereinafter, a first embodiment of the invention will be explained. In the present specification, a direction in which a vibrator 100 to be described below and a friction member 3 to be described below move relatively is defined as an X direction and a direction in which the vibrator 100 is pressed against the friction member 3 is defined as a Z direction. In the Z direction, a direction from the vibrator 100 to the friction member 3 is defined as a +Z direction and a direction from the friction member 3 to the vibrator 100 is defined as a −Z direction. Further, a perpendicular direction perpendicular to the X direction and the Z direction is defined as a Y direction.

Figure 1B:
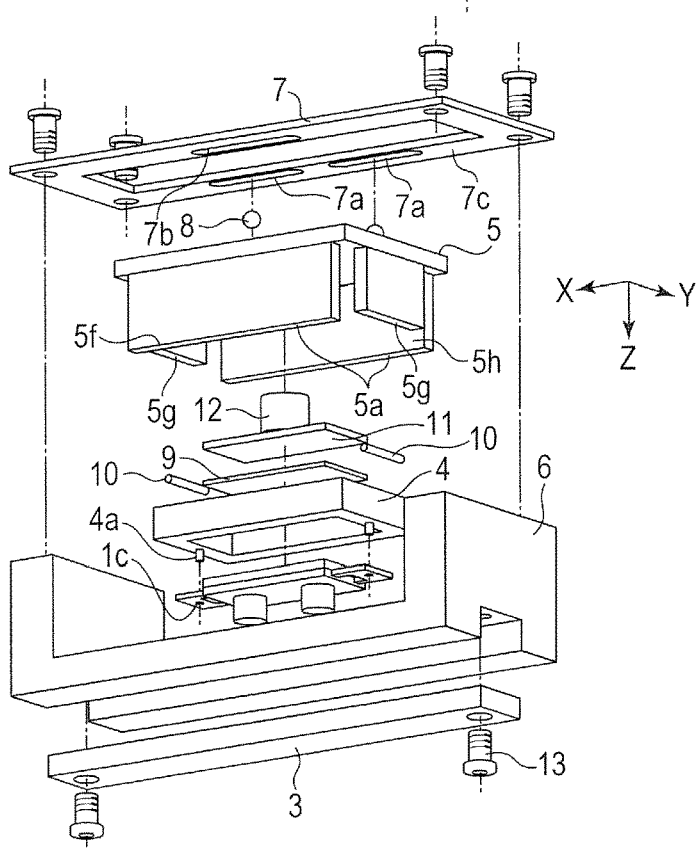

Hereinafter, a configuration of the first embodiment will be explained. FIG. 1A is an exploded perspective view of the vibration wave motor viewed from obliquely above according to the first embodiment, and FIG. 1B is an exploded perspective view viewed from obliquely below. The vibrator 100 is constituted by a vibration plate 1 and a piezoelectric element 2. Hereinafter, configuration of the vibrator 100 will be explained.

Figure 2A:
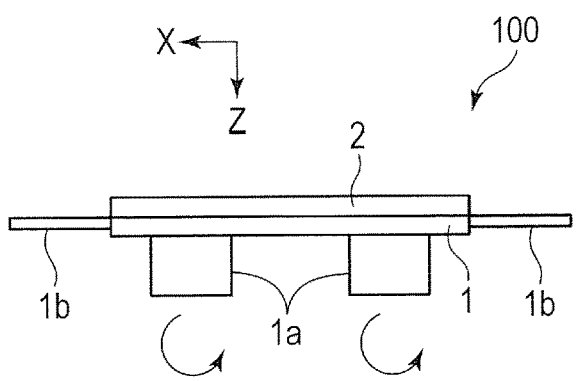
FIGS. 2A, 2B, 2C and 2D are views each illustrating a vibrator 100 of the first embodiment.
Figure 2C:
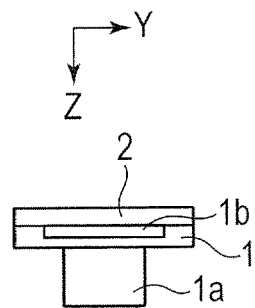
Figure 2B:
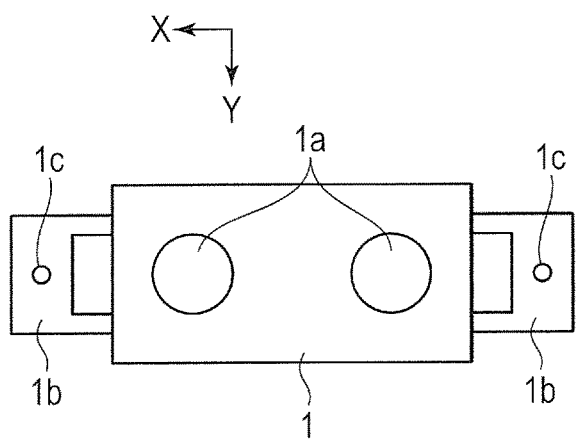
Figure 2D:
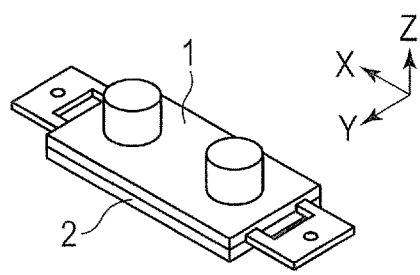

Referring to FIGS. 2A, 2B, 2C and 2D, the vibrator 100 according to the first embodiment will be explained. FIG. 2A is a front view, FIG. 2B is a bottom view, FIG. 2C is a side view and FIG. 2D is a perspective view viewed from the −Z direction. The vibrator 1 includes a substantially rectangular-shaped flat plate portion and protruding portions 1a provided on the flat plate portion. A piezoelectric element 2 that causes the vibrator 1 to generate high frequency vibration (vibration in an ultrasonic region, ultrasonic vibration) is fixed to the vibrator 100. By application of a high frequency voltage to the piezoelectric element 2, the vibrator 100 is set to resonantly vibrate at respective unique vibration modes in the X direction that is a longer side direction thereof and in the Y direction that is a shorter side direction thereof. Such the resonant vibration causes tip ends of the protruding portions 1a to generate elliptic movement as illustrated in FIG. 2A. The vibrator 100 is pressed by a pressurizing spring 12 to be described below so that the protruding portions 1a are abutted to the friction member 3 (see FIG. 1A). When the vibrator 100 in a pressed state against the friction member 3 generates the aforementioned elliptic movement, drive force can be obtained through the friction force. With the configuration, the vibrator 100 can move relatively to the friction member aforementioned high frequency vibration. Namely, the vibrator 100 includes the protruding portions 1a that generate high frequency vibration, the protruding portions 1a are pressedly abutted to the friction member 3 and the vibrator 100 moves relatively to the friction member 3 by the high frequency vibration of the vibrator 100.

The shorter side portion of the rectangular-shaped flat plate portion of the vibrator 1 is provided with connecting portions 1b that connect with a vibrator holding member 4 (See FIG. 1B). Protrusions 4a provided on the vibrator holding member 4 are engaged with connecting holes 1c formed on the connecting portions 1b to position the vibrator plate 1. And the vibration plate 1 is fixed to the holding member 4 by means, such as adhesion. The vibrator 100 and the vibrator holding member 4 are integrated by such the fixation and move relatively to the friction member 3 by the aforementioned high frequency vibration.

Figure 3A:
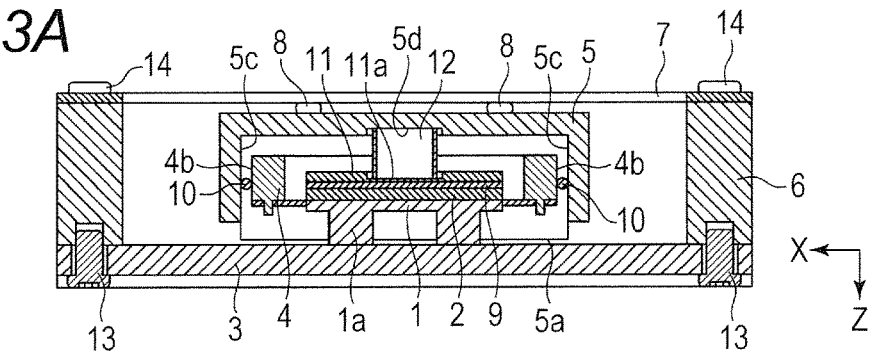
FIGS. 3A, 3B, 3C, and 3D are cross sectional views each illustrating the vibration wave motor according to the first embodiment.
Figure 3B:
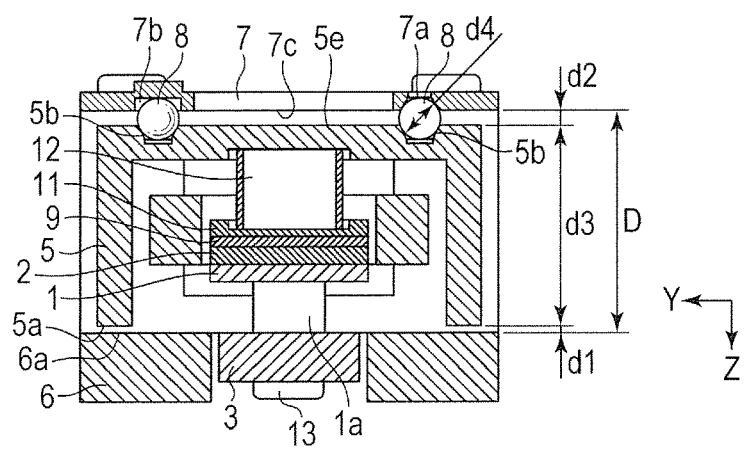
Figure 3C:
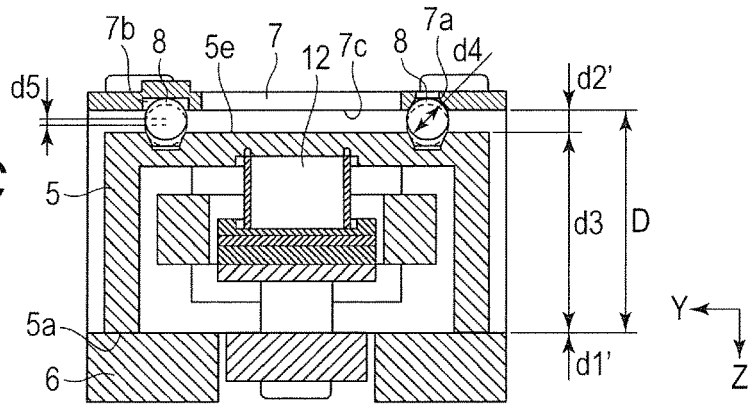
Figure 3D:
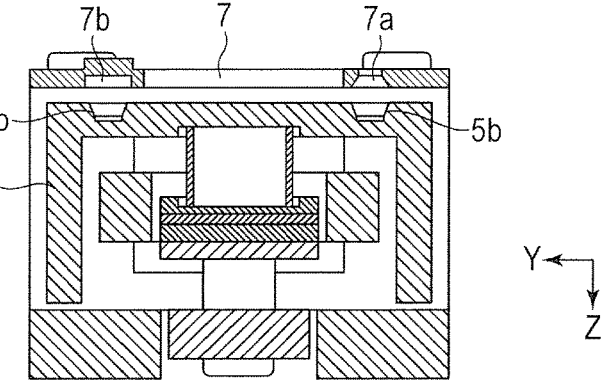

Any of FIGS. 3A, 3B, 3C and 3D is a cross sectional view of the vibration wave motor according to the first embodiment. FIG. 3A is a cross sectional view taken along a plane (XZ plane) extending a center of the pressurizing spring 12 to be described below and including a relatively movable direction (X direction) and the pressing direction. (Z direction). FIGS. 3B, 3C and 3D are cross sectional views taken along a plane (YZ plane) extending centers of the pressurizing spring 12 and rotating members 8 to be described below and including a perpendicular direction (Y direction) perpendicular to the relatively movable direction and the pressing direction (Z direction). FIG. 3D is a view in which the rotating members 8 are omitted in the cross sectional view of FIG. 3B.

Referring to FIGS. 1A, 3A, 3B and 3D, a structure of the vibration wave motor of the first embodiment will be explained. The friction member 3 is fixed to one side of the first fixing member 6 with a plurality of screws 13. And a second fixing member 7 is fixed to the other side of the first fixing member 6 with a plurality of screws 14. A pair of rollers 10 is provided between inner walls 5c of the movable member 5 extending in a shorter side direction thereof and side walls 4b of the vibrator holding member 4 extending in a shorter side direction thereof. The rollers 10 rotate to allow the movable member 5 and the vibrator holding member 4 to move relatively in the pressing direction (Z direction) and to restrict them to move relatively in the relatively movable direction (X direction). By allowing the movable member 5 and the vibrator holding member 4 to move relatively in the Z direction, tolerance generated by part tolerance, assembling tolerance or the like can be accommodated, thereby enabling the protruding portions 1a of the vibrator 100 to be abutted to the friction member 3 stably. Further, the relative movement between the movable member 5 and the vibrator holding member 4 is restricted in the X direction so that the movable member 5 integrated with the vibrator 100 and the vibrator holding member 4 without looseness can move relatively to the friction member 3 when the vibrator 100 moves relatively to the friction member 3. Namely, the movable member 5 can move relatively to the first fixing member 6 to which the friction member 3 is fixed and the second fixing member 7.

Subsequently, a pressing mechanism for pressing the vibrator 100 against the friction member 3 will be explained. The pressurizing spring 12 applies pressing force to a pressing surface 5d of the movable member 5 and a pressing surface 11a of the pressing plate 11. With this configuration, the pressing plate 11 presses the vibrator 100 against the friction member 3 through an elastic member 9. The vibrator 100 is pressed through the elastic member 9 so that there can be obtained effects, such as dispersion and optimization of the pressing force applied by the pressing plate 11 and a decrease in attenuation of the high frequency vibration occurring at the vibrator 100.

Next, a rotating mechanism to reduce sliding loads between the movable member 5 and the second fixing member 7 upon relative movement will be explained. A plurality of first recessed portions 5b are provided on a surface 5e of the movable member 5 on a side of the second fixing member 7. A plurality of the second recessed portions 7a and 7b are provided on a surface 7c of the second fixing member 7 on a side of the movable member 5. And each of the first recessed portions 5a and each of the second recessed portions 7a and 7b are provided at a corresponding one of positions. For example, as illustrated on the YZ plane of FIG. 3B, each of the first recessed portions 5b is positioned opposed to a corresponding one of the second recessed portions 7a and 7b and each of the rotating members 8 (three) is sandwiched between the first recessed portions 5b and the second recessed portions 7a and 7b. The movable member 5 is pressed against the second fixing member 7 through the rotating members 8 by the pressurizing spring 12. Namely, the three rotating members 8 are provided between the second recessed portions 7a and 7b provided on the surface 7c of the second fixing member 7 on the side of the movable member 5 and the first recessed portions 5b provided on the surface 5e of the movable member 5 on the side of the second fixing member 7. And the movable member 5 is held in a relatively movable and freely slidable manner in the relatively movable direction by the second fixing member 7.

When the vibrator 100 is integrated with the movable member 5 and moves relatively to the friction member 3 by the high frequency vibration, the rotating members 8 rotate between the first recessed portions 5b and the second recessed portions 7a and 7b so that the sliding loads generated between the movable member 5 and the second fixing member 7 can be reduced. Further, in groups each including one of the second recessed portions 7a and 7b and one of the first recessed portions 5b, the one being opposed to the other, two of the groups each including the first recessed portion 5b and the second recessed portion 7a are constituted by recessed portions each having an inclined surface in a V-shape (see FIG. 3D). The rotating members 8 are configured to be sandwiched between the two groups of the V-shaped recessed portions whereby relative movement can be performed in a direction perpendicular to the relatively movable direction without looseness.

Up to here, the vibration wave motor of the first embodiment has been explained. This vibration wave motor of the first embodiment is used for a lens drive apparatus so that an optical element, such as a lens can be driven in an optical axis direction. For example, the movable member 5 is coupled with an optical element, such as a lens with unillustrated coupling means to fix either one or both of the first fixing member 6 and the second fixing member 7 to a housing, such as a lens barrel. And drive force of the vibrator 100 by the high frequency vibration enables the optical element, such as the lens to move with respect to the housing, such as the lens barrel in the optical axis direction.

The falling off restriction portion 5a that is a feature of the invention will be explained. Referring to FIG. 3B, the movable member 5 is provided with the falling off restriction portions 5a at portions thereof opposed to the first fixing member 6. As described above, the movable member 5 is pressed together with the rotating members 8 against the second fixing member 7 by the pressurizing spring 12. Accordingly, a distance between a surface 5e where the first recessed portions 5b are provided and a surface 7c where the second surface portions 7a and 7b are provided is denoted by a gap d2. Further, the second fixing member 7 is fixed to the first fixing member 6 so that a length between the surface 7c of the second fixing member 7 and the opposed portion 6a of the first fixing member 6 is denoted by a space length D. A gap d1 between the falling off restriction portions 5a and the opposed portion 6a of the first fixing member 6 is determined by a following expression with a height d3 from the surface 5e of the movable member 5 to the falling off restriction portions 5a, the space length D and the gap d2.

$$d1=D-(d2+d3) \quad (1)$$

Namely, when the height d3 of the movable member 5 is determined, the gap d1 between the falling off restriction portions 5a and the opposed portion 6a is determined. However, this does not apply to a case where external forces that are applied to the movable member 5 in the +Z direction exceed the aforementioned pressing force when impact or the like is applied to the vibration wave motor, since the movable member 5 is moved in the +Z direction. It is noted that the height d3 of the movable member 5 is an external dimension of the movable member 5 and the space length D is a length determined by dimensions of the first fixing member 6 and the second fixing member 7 that are fixed, so that the height d3 and the space length D are not changed even when the movable member 5 moves in the +Z direction. And, as illustrated in FIG. 3C, the gap d1 and the gap d2 are changed to a gap d1' and a gap d2', respectively, with movement of the movable member 5.

Since the height d3 and the space length D are constant, when the expression (1) is deformed, the following expression can be obtained.

$$d1'+d2'=D-d3=\text{constant} \quad (2)$$

Namely, as a value of the gap d2' becomes larger, a value of the gap d1' becomes smaller.

Further, when the movable member 5 is moved in the +Z direction by external forces, such as impact, the falling off restriction portions 5a and the opposed portion 6a of the first fixing member 6 are brought into abutment. In FIG. 3C, a state where the rotating member 8 is abutted to the second recessed portion 7b is illustrated by a solid line and a state where the rotating members 8 are abutted to the first recessed portions 5b are illustrated by broken lines. When the falling off restriction portions 5a and the opposed portion 6a are abutted to each other, d1'=0 is obtained so that a maximum gap d2max upon such the abutment is expressed as follows.

$$d2\max=d1+d2=D-d3 \quad (3)$$

Accordingly, when the external forces, such as impact are applied to the vibration wave motor, a range of the gap d2' in a case where the movable member 5 is moved in the +Z direction is expressed as follows:

$$d2<d2'<d2\max=d1+d2 \quad (4),$$

and a movable range of the movable member 5 in the pressing direction is the gap d1 from the expression (4). As described above, the falling off restriction portions 5a are abutted to the opposed portion 6a that is opposed to the falling off restriction portions 5a so that the movable range (d1) of the movable member 5 is restricted in the pressing direction.

In such the restricted state, the height d3 of the movable member 5 is set in such a manner that the maximum gap d2max between the surface 5e where the first recessed portions 5b are provided and the surface 7c where the second recessed portions 7a and 7b are provided and a diameter d4 of the rotating members 8 satisfy the following relation.

$$d2\max<d4 \quad (5)$$

Namely, when the movable range (d1) of the movable member 5 is restricted by the falling off restriction portions 5a, the maximum gap d2max between the surface 5e where the first recessed portions 5b are provided and the surface 7c where the second recessed portions 7a and 7b are provided is smaller than the diameter d4 of the rotating members 8.

In a state where the movable range (d1) of the movable member 5 is restricted, the rotating members 8 are brought into a state freely movable between the first recessed portions 5b and the second recessed portions 7b. And the movable range d5 of the rotating members 8 in the Z direction is substantially equal to the movable range (d1) of the movable member 5. However, in a case where the maximum gap d2max between the surface 5e where the first recessed portions 5b are provided and the surface 7c where the second recessed portions 7a and 7b are provided are larger than the diameter d4 of the rotating members 8, the rotating members 8 fall from between the second recessed portions 7b and the first recessed portions 5b.

In the first embodiment, the movable range (d1) of the movable member 5 is restricted by the falling off restriction portions 5a so as to prevent the gap d2 between the surface 5e where the first recessed portions 5b are provided and the surface 7c where the second recessed portions 7a and 7b are provided from becoming larger than the diameter d4 of the rotating members 8. Accordingly, in a case where external forces, such as impact are applied to the vibration wave motor, even if the movable member 5 is moved in the +Z direction, the rotating members 8 can be prevented from falling off of the gap d2 between the surface 5e where the first recessed portions 5b are provided and the surface 7c where the second recessed portions 7a and 7b are provided.

As explained up to here, the movable range d5 of the rotating members 8 is preferably configured small in order to make the gap d2 between the surface 5e where the first recessed portions 5b are provided and the surface 7c where the second recessed portions 7a and 7b are provided smaller than the diameter d4 of the rotating members 8. Hereinafter, a positional relation between the falling off restriction portions 5a and the rotating members 8 to make the movable range d5 of the rotating members 8 small will be explained below.

Figure 4A:
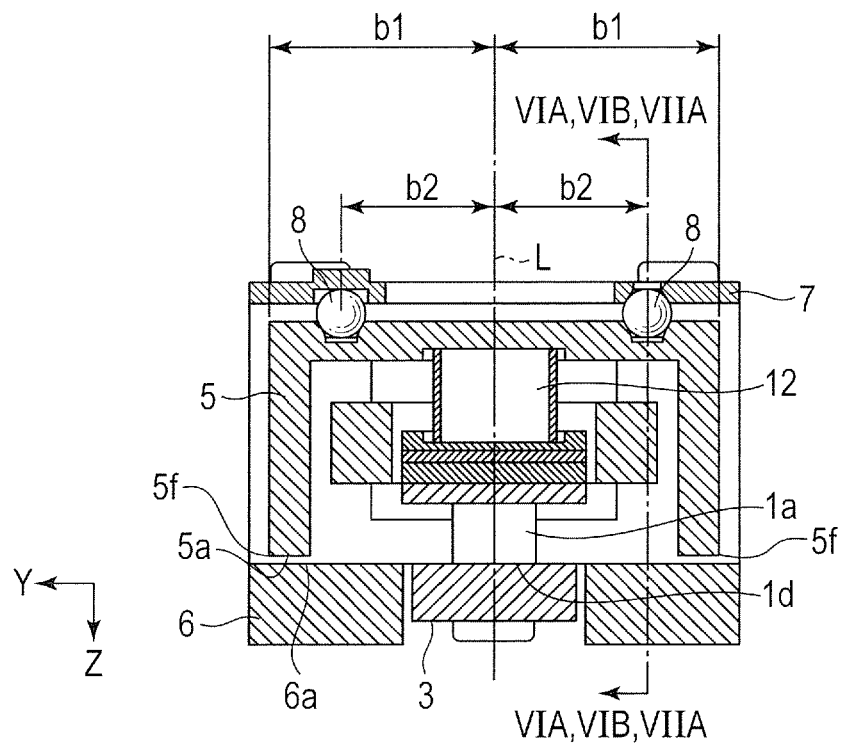
FIGS. 4A and 4B are cross sectional views each illustrating a positional relation between a falling off restriction portions 5a and the rotating members 8 according to the first embodiment.
Figure 4B:
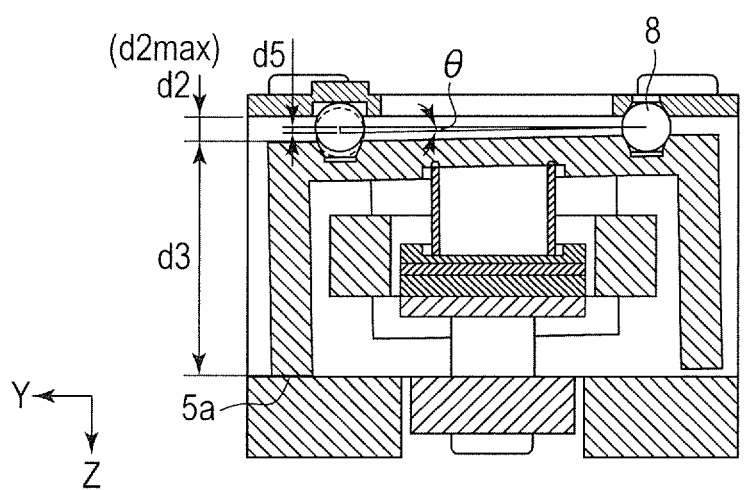

Referring to FIGS. 4A and 4B illustrating cross sections, the positional relation between the falling off restriction portions 5a and the rotating members 8 of the first embodiment will be explained. Distances from a central line L of an abutment surface 1d where the protruding portions 1a of the vibrator 100 and the friction member 3 are abutted to end portions 5f of the falling off restriction portions 5a are denoted by b1 and distances from the central line L of the abutment surface 1d to a center of the rotating members 8 are denoted by b2. Here, the falling off restriction portions 5a are provided to satisfy the following.

$$b1 > b2 \quad (6)$$

Namely, in a direction (Y direction) perpendicular to each of the relatively movable direction (X direction) and the pressing direction (Z direction), the falling off restriction portions 5a with the abutment surface 1d between the protruding portions 1a of the vibrator 100 and the friction member 3 as a center are provided outer than the rotating members 8.

FIG. 4B illustrates a state where the movable member 5 rotates around an axis (around an X axis) in an advancing direction with the rotating member 8 as a center so that the falling off restriction portion 5a is abutted to the opposed portion 6a. Where a rotational angle of the movable member 5 is denoted by θ in this state, the movable range d5 of the rotating member 8 is determined by the rotational angle θ. Namely, as the rotational angle θ is larger, the movable range d5 of the rotating member 8 becomes larger.

Figure 5A:
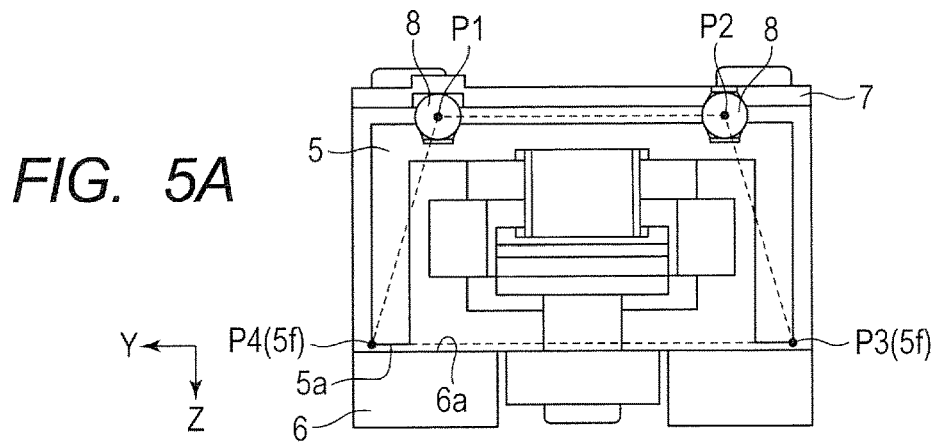
FIGS. 5A and 5B are schematic views each illustrating a positional relation between the falling off restriction portions 5a and the rotating members 8 according to the first embodiment.
Figure 5B:
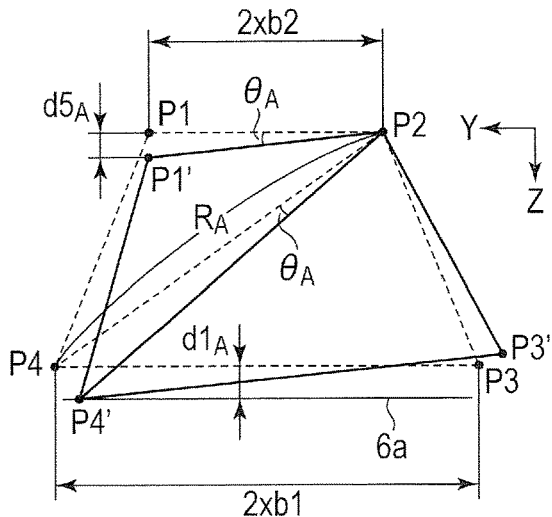
Figure 5C:
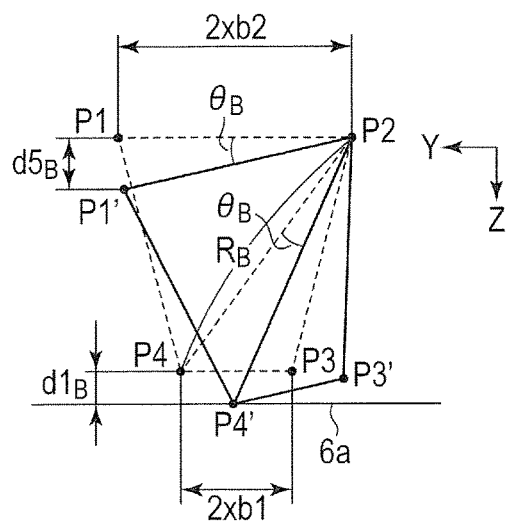
FIG. 5C is a view illustrating a positional relation between falling off restriction portions 5a and rotating members 8 according to an embodiment different from the first embodiment.

Hereinafter, the movable range d5 of the rotating member 8 in the first embodiment and a movable range d5 of the rotating member 8 in another embodiment will be described. FIGS. 5A and 5B schematically illustrate a positional relation between the failing off restriction portions 5a and the rotating members 8 of the first embodiment in the Y direction perpendicular to the X direction and the Z direction. Each of center positions of the two rotating members 8 illustrated in FIG. 5A is denoted by a corresponding one of a point P1 and a point P2, and each of end portions 5f of the two failing off restriction portions 5a on a side of the opposed portion 6a is denoted by a corresponding one of a point P3 and a pint P4. FIG. 5B illustrates a positional relation among the points P1, P2, P3 and P4 in a configuration in which the falling off restriction portions 5a are provided outer than the rotating members 8. FIG. 5C schematically illustrates positional relations among the points P1, P2, P3 and P4 in configuration in which the falling off restriction portions 5a are provided inner than the rotating members 8 in the Y direction perpendicular to the X direction and the Z direction, as another embodiment different from the first embodiment.

The configuration illustrated in FIG. 5B is denoted by a configuration A and the configuration illustrated in FIG. 5C is denoted by a configuration B, and the movable range d5 of the rotating members 8 in each of the configurations will be explained. A position of the movable member 5 before its rotation is illustrated by a rectangle formed by a broken line that connects each of vertexes as which the points P1, P2, P3 and P4 serve. Further, a position of the movable member 5 after it has rotated with the point P2 as a center is illustrated by a rectangle formed by a solid line that connects each of vertexes as which points P1', P2', P3' and P4' serve. It is noted that the movable member 5 is assumed to rotate until the falling off restriction portion 5a is abutted to the opposed portion 6a. In FIG. 4A, the distances from the abutment surface 1d where the vibrator 100 abuts to the friction member 3 to the falling off restriction portions 5a are denoted by b1 and the distances from the same to the rotating members 8 are denoted by b2 so that a length of a line segment P1-P2 is denoted by 2×b2 and a length of a line segment P3-P4 is denoted by 2×b1.

In the configuration A, the falling off restriction portions 5a are provided outer than the rotating members 8 so that the line segment P1-P2<P3-P4 is satisfied. In the configuration B, the falling off restriction portions 5a are provided inner than the rotating members 8 so that the line segment P1-P2>P3-P4 is satisfied. A displacement amount $d1_A$ and a displacement amount $d1_B$ when the point P4 is displaced to the point P4' by rotation of the movable member 5 mean the gap d1 between the falling off restriction portion 5a and the opposed portion 6a in the pressing direction (Z direction) in FIG. 3B. Further, a displacement amount $d5_A$ and a displacement amount $d5_B$ when the point P1 is displaced to the point P1' by rotation of the movable member 5 mean the movable range d5 of the movable member 8 in FIG. 3C. Both a rotational angle $θ_A$ and a rotational angle $θ_B$ of ∠P1P2P1' denote a rotational angle θ of the movable member 5 in FIG. 4B. The rotational angle $θ_A$ and the rotational angle $θ_B$ are also angles at which the points P4 are rotated with the points P2 as centers, namely, angles at which the moveable member 5 rotates until that the failing off restriction portion 5a is abutted to the opposed portion 6a. Where a length $R_A$ and a length $R_B$ of line segments P2-P4 are rotational radiuses, the displacement amount $d1_A$ and the displacement amount $d1_B$ are determined by the rotational angle $θ_A$ and the rotational angle $θ_B$, and the length $R_A$ and the length $R_B$. Namely, as the rotational radius becomes larger, the falling off restriction portion 5a is abutted to the opposed portion 6a at a smaller rotational angle θ.

In contrast to the configuration B in which the falling off restriction portions 5a are provided inner than the rotating members 8, in the configuration A, the falling off restriction portions 5a are provided outer than the rotating members 8, so that the rotational radius $R_A$ of the configuration A becomes larger ($R_A > R_B$). Accordingly, to nearly equalize the displacement amount $d1_A$ and the displacement amount $d1_B$, the rotational angle $θ_A$ in the configuration A having the larger rotational radius $R_A$ necessarily becomes smaller than the other ($θ_A < θ_B$). As mentioned above, since, as the rotational angle θ becomes larger, the movable range d5 of the rotating members 8 becomes larger, the displacement amount $d5_A$ of the configuration A becomes smaller than the displacement amount $d5_B$ of the configuration B ($d5_A < d5_B$). As explained above, even in a case where the gap d1 between the falling off restriction portion 5a and the opposed portion 6a in the pressing direction (Z direction) is set to a predetermined value, by employing the configuration in which the falling off restriction portions 5a are provided to extend outward than the rotating members 8, the movable range d5 of the rotating members 8 can be made smaller.

Figure 6A:
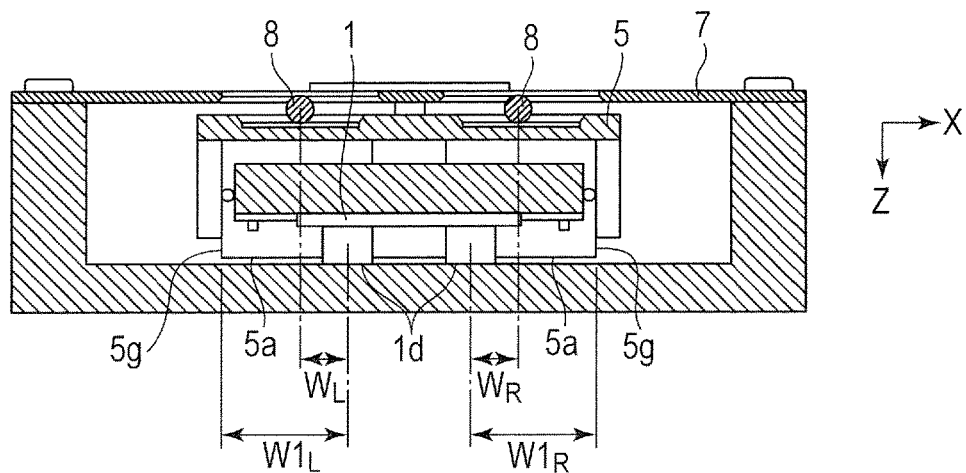
FIGS. 6A and 6B are cross sectional views each illustrating the positional relation between the falling off restriction portions 5a and the rotating members 8 according to the first embodiment.
Figure 6B:
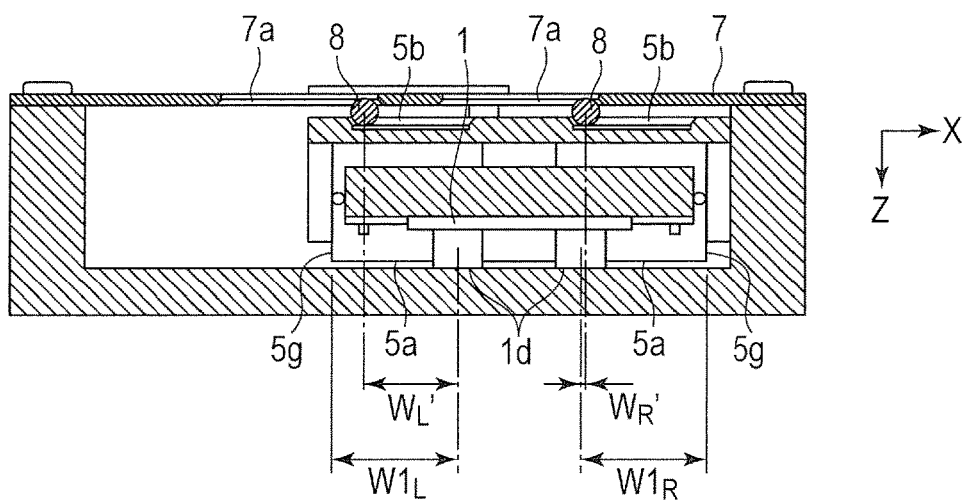

Referring to FIGS. 6A and 6B, the falling off restriction portions 5a of the first embodiment in the relatively movable direction (X direction) will be explained. FIGS. 6A and 6B are cross sectional views taken along the cross-section line VIA-VIA, VIB-VIB in FIG. 4A, and they are taken along a plane (XZ plane) passing centers of the two rotating members 8 and including the relatively movable direction (X direction) and the pressing direction (Z direction). Further, FIG. 6A illustrates a state where the movable member 5 is located in the center of the movable range of the movable member 5 in the relatively movable direction and FIG. 6B illustrates a state where the movable member 5 is located at an end of the movable range thereof in the relatively movable direction. Distances between the centers of the abutment surfaces 1d where the protruding portions 1a of the vibrator 100 are abutted to the friction member 3 and the end portions 5g of the falling of restriction portion 5a in the relatively movable direction are denoted by $W1_L$ and $W1_R$, and distances between the centers of the abutment surfaces 1d and the centers of the rotating members 8 are denoted by $W_L$ and $W_R$. Here, the falling off restriction portion 5a is provided so as to satisfy the following.

$$W1_L > W_L, \ W1_R > W_A \quad (7)$$

Namely, in the relatively movable direction, the falling off restriction portion 5a is provided outer than the rotating members 8 with respect to the abutment surfaces 1d. Similarly to the case of the positional relation between the falling off restriction portion 5a and rotating members 8 in the Y direction perpendicular to the X direction and the Z direction mentioned above, the configuration in which the falling off restriction portions 5a are also provided to extend outward than the rotating members 8 is employed so that the movable range d5 of the rotating members 8 can be made smaller.

Subsequently, when the movable member 5 relatively moves by high frequency vibration of the vibrator 100, the rotating members 6 relatively move on first recessed portions 5b so that a relatively positional relation between the rotating members 8 and the falling off restriction portions 5a is changed. When the movable member 5 has relatively moved, distances between the centers of the abutment surfaces 1d and the centers of the rotating members 8 are denoted by $W_L'$ and $W_R'$. It is noted that both of the distances $W1_L$ and $W1_R$ between the centers of the abutment surfaces 1d and the end portions 5g of the falling off restriction portions 5a in the relative movable direction are not changed. As illustrated in FIG. 6B, when the movable member 5 is positioned at the end of the relatively movable range, since the falling restriction portion 5a is provided to extend outward than the rotating members 8 with respect to the abutment surfaces 1d, the following is satisfied.

$$W1_L > W_L', \ W1_R > W_R' \quad (8)$$

Accordingly, since the falling off restriction portion 5a is provided to extend outward than the rotating members 8 with respect to the abutment surfaces 1d, throughout the entirety of the movable range of the movable member 5, an effect in which the movable range d5 of the rotating members 8 becomes much smaller can be obtained.

Figure 7A:
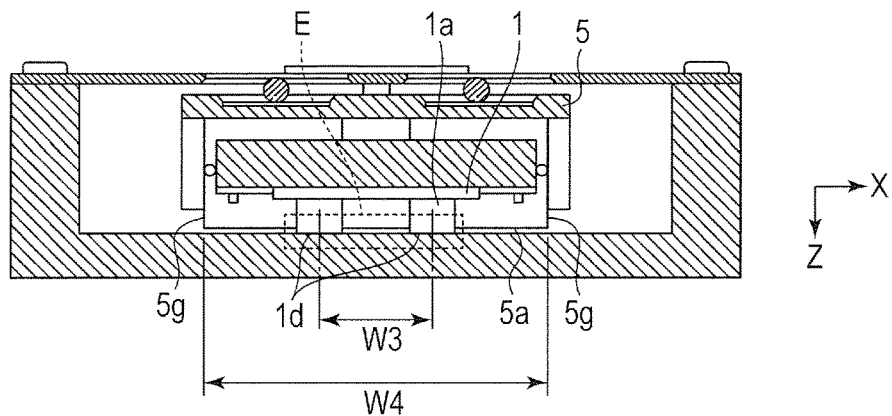
FIGS. 7A and 7B are cross sectional views each illustrating an effect of preventing abrasion powder from being scattered by the falling off restriction portions 5a according to the first embodiment.
Figure 7B:
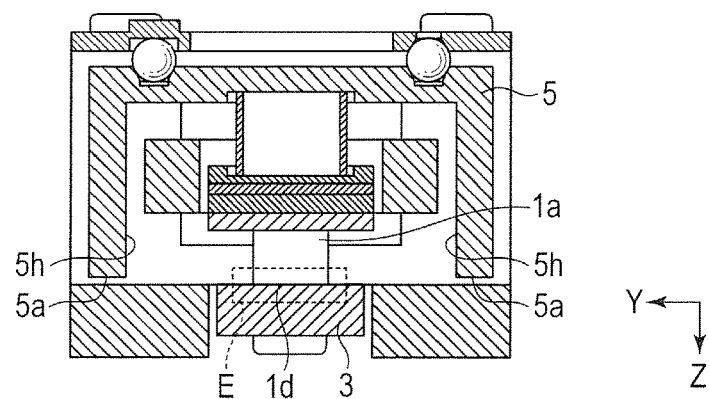

Referring to FIGS. 7A and 7B, an effect of preventing abrasion powder from being scattered by the falling off restriction portions 5a will be explained. In the vibration wave motor of the invention, drive force can be obtained by friction between the protruding portions 1a of the vibrator 100 and the friction member 3. With the friction between the protruding portions 1a and the friction member 3, either one of or both of the protruding portions 1a and the friction member 3 wear away to generate abrasion powder. The generated abrasion powder is scattered to be adhered to an unillustrated optical element, such as a lens and to cause an adverse effect on an image region E illustrated in FIG. 7A, the abrasion powder is generated by friction between the protruding portions 1a and the friction member 3. However, in the first embodiment, the falling off restriction portions 5a are provided to extend outward than the protruding portions 1a in the relatively movable direction. More specifically, the falling off restriction portions 5a extend a length W4 in the relatively movable direction and the length W4 is dimensioned longer than the gap W3 between the two abutment surfaces d where the protruding portions 1a of the vibrator 100 and the friction member 3 abut to each other. With such the configuration of the falling off restriction portions 5a, the abrasion powder generated in the region E is prevented from being scattered outside. Namely, even when the abrasion powder is generated, the abrasion powder is prevented from being scattered outside beyond the movable member 5 by the inner walls 5h constituting the falling off restriction portions 5a extending in the relatively movable direction.

Figure 8:
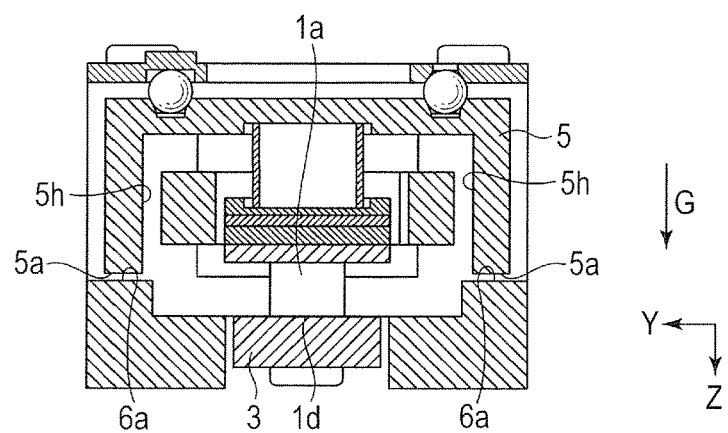
FIG. 8 is a cross sectional view illustrating a modified example of the first embodiment.

FIG. 8 is a cross sectional view illustrating a modified example of the first embodiment. With this configuration, in a gravitational force direction illustrated by an arrow G in FIG. 8, the falling off restriction portions 5a and the opposed portions 6a are provided at positions higher than the abutment surfaces 1d where the protruding portions 1a and the friction member 3 abut to each other. As mentioned above, regarding generation of abrasion powder by friction between the protruding portions 1a and the friction member 3, the abrasion powder is prevented from being scattered outside beyond the movable member 5 by the inner walls 5h of the movable member 5. However, in the case as illustrated in FIG. 3B, there is a possibility that abrasion powder is scattered from the gaps d1 between the falling off restriction portions 5a and the opposed portions 6a. The scattered abrasion powder falls in the gravitational force direction illustrated by the arrow G due to gravitational force, but, as illustrated in FIG. 8, the falling off restriction portions 5a and the opposed portions 6a are provided at the positions higher than the abutment surfaces 1d in the gravitational force direction, so that the effect of preventing the abrasion powder from being scattered can be enhanced further.

As above, in the vibration wave motor of the first embodiment, the movable member 5 is provided with the falling off restriction portions 5a to restrict the movable range (d1) of the movable member 5 with respect to the first fixing member 6. Accordingly, the gap d2 between the surface 5e and the surface 7c where the recessed portions sandwiching the rotating members 8 are provided not to become larger than the diameter d4 of the rotating members 8. Resultantly, in even a case where external forces, such as impact are applied to the vibration wave motor, stable drive can be achieved while preventing the rotating members 8 from falling off of the recessed portions.

It is noted that although the configuration in which the single movable member 5 is provided with the falling off restriction portions 5a and the first recessed portions 5b has been explained in the first embodiment, a configuration including a first movable member provided with the first recessed portions 5b and a second movable member as which the movable member 5 provided with the falling off restriction portions 5a serves may be employed. In the separated members configured as above, for example, the first movable member may be constituted by material strong in rigidity, such as metal and the second movable member may be constituted by material light in specific weight, such as resin. With such the configuration, an entire weight of the movable member 5 can be reduced without deteriorating the rigidity of the first recessed portions 5b where the rotating members 8 rotate under pressing force.

Further, in the first embodiment, although the movable member 5 is configured to move, integratedly with the vibrator 100, with respect to the first fixing member 6 to which the friction member 3 is fixed, the movable member 5 may be configured to move, integratedly with the friction member 3, with respect to the fixing member to which the vibrator 100 is fixed. Furthermore, although the configuration in which the movable member 5 is provided with the falling off restriction portions 5a, which abut to the opposed portions 6a of the first fixing member 6 has been explained in the first embodiment, a configuration in which the fixing member is provided with the falling off restriction portions 5a, which abut to an opposed portion of the movable member 5 may be employed.

Second Embodiment

A second embodiment of the invention will be explained below. In the first embodiment, the falling off restriction portions 5a are configured to extend in the relatively movable direction (X direction) to restrict falling off of the rotating members 8 by the falling off restriction portions 5a. In contrast, in the second embodiment, falling off restriction portions 5a2 are configured to extend in the Y direction perpendicular to the X direction and the Z direction. It is noted that the same components as those of the first embodiment are denoted by the same reference numerals in the drawings. Further, explanation of the same components as those in the first embodiment will be omitted and only components different from those of the first embodiment will be explained.

Figure 9A:
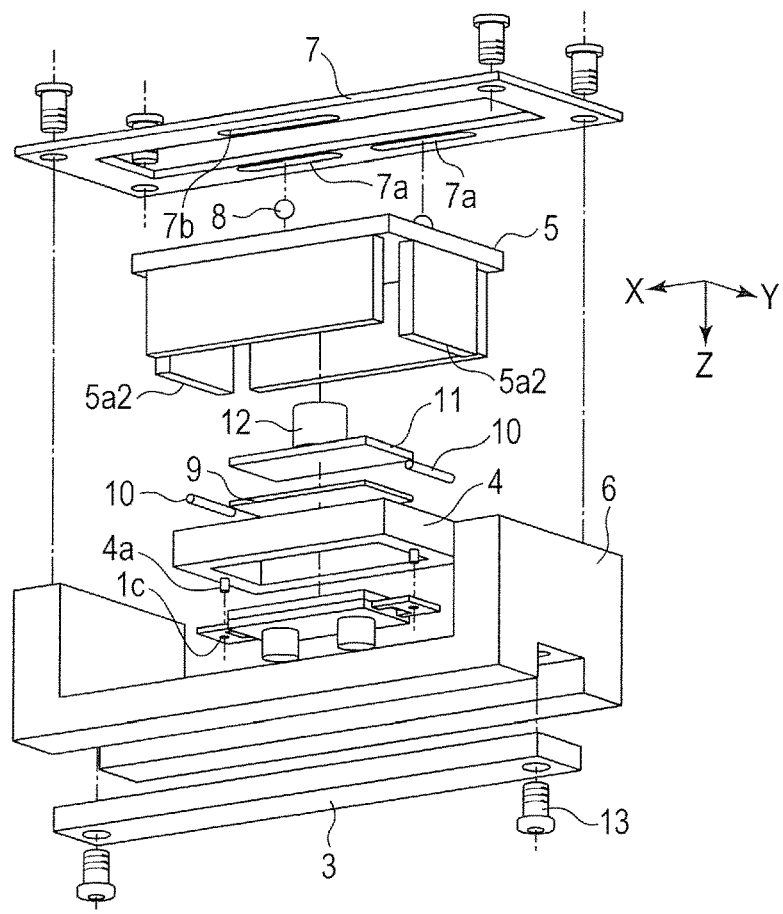
FIG. 9A is an exploded perspective view of a vibration wave motor according to a second embodiment.
Figure 9B:
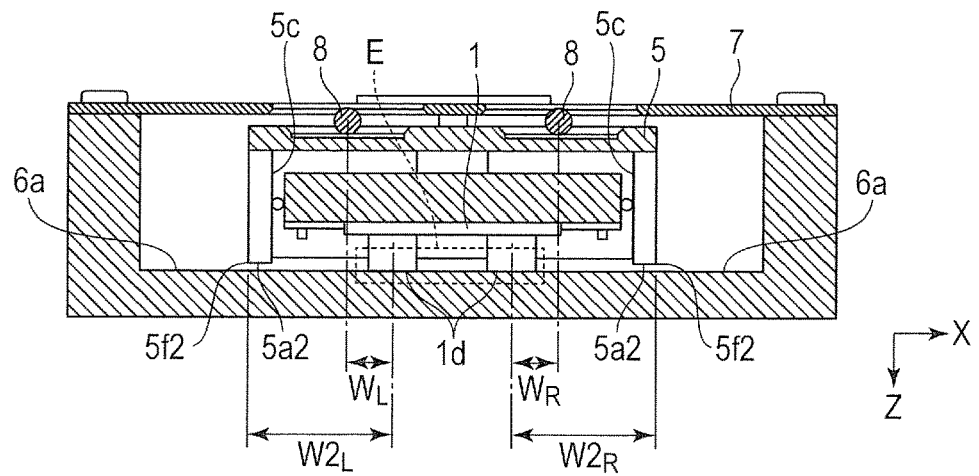
FIG. 9B is a cross sectional view illustrating a positional relation between falling off restriction portions 5a2 and rotating members 8 according to the second embodiment.

Referring to FIGS. 9A and 9B, the falling of restriction portions 5a2 in the second embodiment will be explained. FIG. 9A an exploded perspective view illustrating a vibration wave motor of the second embodiment and FIG. 9B is a cross sectional view taken along a plane (XZ plane) passing centers of two rotating members 8 and including the relatively movable direction (X direction) and the pressing direction (Z direction).

In the second embodiment, as relations of distances $W2_L$ and $W2_R$ between the abutment surfaces 1d where the vibrator 100 and the friction member 3 abut to each other and end portions 5f2 of the falling off restriction portions 5a2 and distances $W_L$ and $W_R$ between the abutment surfaces 1d and the rotating members 8 in the relatively movable direction (X direction), the expression (7) is also established. Namely, in the second embodiment, similarly to in the first embodiment, the falling off restriction portions 5a2 are provided to extend outward than the rotating members 8 throughout the entirety of the movable range of the movable member 5. With this configuration, the movable range d5 of the rotating members 8 can be made smaller.

Further, in the relatively movable direction (X direction), the falling off restriction portions 5a2 are provided to extend outward than the protruding portions 1a. With such the configuration, abrasion powder is prevented from being scattered outside beyond the movable member 5 by the inner walls 5c of the movable member 5, even when the abrasion powder generated at the region E is scattered.

As explained above, the movable member 5 is provided with the falling off restriction portions 5a2 to restrict the movable range (d1) of the movable member 5 even in the second embodiment, similarly to the first embodiment. With the configuration, in even a case where external forces, such as impact are applied to the vibration wave motor, stable drive can be achieved while preventing the rotating members 8 from failing off of the recessed portions. Although the preferred embodiments of the invention have been explained as above, the invention is not limited to the embodiments and various modifications or changes may be made within the gist of the invention.

The invention is applicable to electric appliances that are required to be compact and lightweight and have a wide range of drive speed, specifically such as a lens drive apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-141270, filed Jul. 15, 2015, which is hereby incorporated by reference herein in its entirety.

What is claimed is:

1. A vibration wave motor comprising:
    a vibrator including a protruding portion that performs high frequency vibration;
    a friction member, the vibrator being pressed to cause the protruding portion to abut to the friction member;
    a fixing member configured to be attached or connected to either the vibrator or the friction member;
    a movable member that moves integratedly with either the vibrator or the friction member;
    a plurality of rotating members enabling relative movement between the friction member and the movable member; and
    a falling off restriction portion that prevents the rotating members provided in either the fixing member or the movable member from falling off,
    wherein the rotating members are provided between a first recessed portion provided on a surface of the movable member and a second recessed portion provided on a surface of the fixing member opposed to the movable member,
    in case where at least one of the movable member and the fixing member moves in a pressing direction of a pressurizing member, so as to move the first recessed portion and the second recessed portion to a direction separating each other, wherein the falling off restriction portion abuts to an opposed portion opposed to the falling off restriction portion to restrict a movable range of the movable member in a pressing direction, so that a gap between surface provided with the first recessed portion and the surface provided with the second recessed portion is smaller than a diameter of the rotating members.

2. A vibration wave motor according to claim 1, wherein in groups each including the first recessed portion and the second recessed portion, the first recessed portion being opposed to the second recessed portion, the first recessed portions and the second recessed portions of at least two of the groups are recessed portions including V-shaped inclined surfaces.

3. A vibration wave motor according to claim 1,
wherein the fixing member is constituted by a first fixing member that fixes either the vibrator or the friction member and a second fixing member that holds the movable member in a relatively movable manner and that is fixed to the first fixing member, and
wherein the rotating members are provided between the movable member and the second fixing member.

4. A vibration wave motor according to claim 3,
wherein the vibrator or the friction member moves integratedly with the movable member and relatively to the second fixing member.

5. A vibration wave motor according to claim 1,
wherein the falling off restriction portion is provided outer than the rotating members with an abutment surface as a center between the vibrator and the friction member in a direction perpendicular to each of a direction of the relative movement and the pressing direction.

6. A vibration wave motor according to claim 1,
wherein the falling off restriction portion is provided outer than the rotating members with respect to an abutment surface between the vibrator and the friction member in a direction of the relative movement.

7. A vibration wave motor according to claim 1,
wherein the falling off restriction portion is provided to extend outward than the rotating members in a direction of the relative movement.

8. A vibration wave motor according to claim 1,
wherein the falling off restriction portion and the opposed portion are provided at a position higher than an abutment surface between the vibrator and the friction member in a gravitational force direction.

9. A vibration wave motor according to claim 1,
wherein the vibration wave motor is an ultrasonic motor that performs the high frequency vibration that is vibration in an ultrasonic region.

* * * * *